May 17, 1960   T. A. McKELVEY   2,937,032
SLED
Filed April 7, 1958
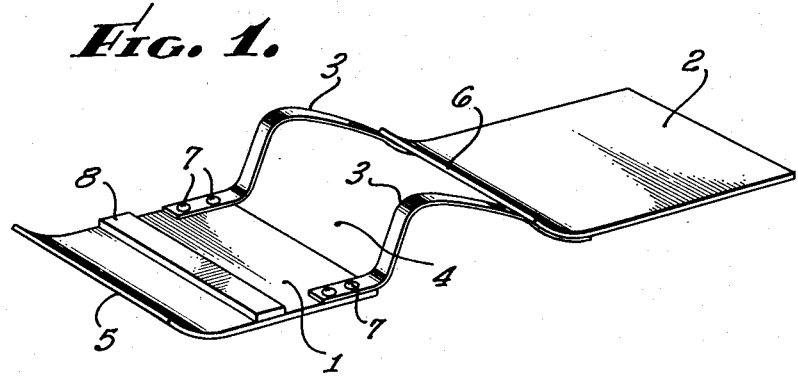
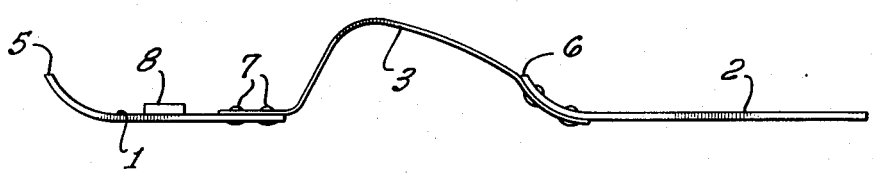
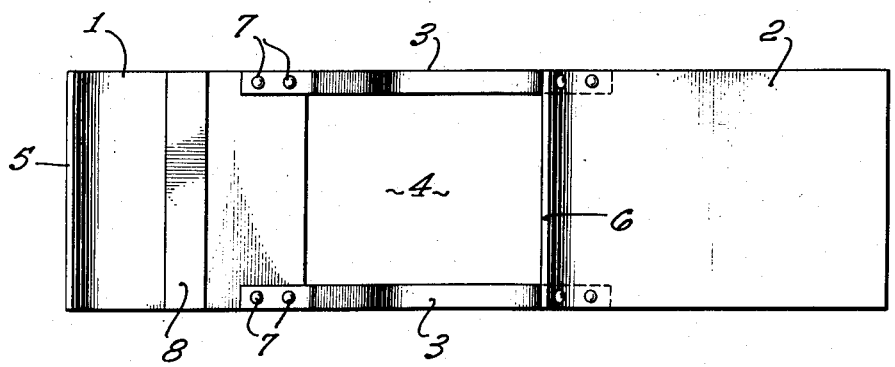
INVENTOR.
TERRY A. McKELVEY
BY
Paul A. Weilein
ATTORNEY.

United States Patent Office 2,937,032
Patented May 17, 1960

2,937,032

SLED

Terry A. McKelvey, Pasadena, Calif.

Application April 7, 1958, Serial No. 726,869

2 Claims. (Cl. 280—16)

This invention relates to sleds.

It is an object of this invention to provide a sled of the toboggan type that is light as to weight, compact, simple as to construction and subject to safe use by unskilled persons.

Another object of this invention is to provide a sled such as described that is constructed and arranged to be operated and steered in a novel manner.

An additional object of this invention is to provide a sled such as described that is constructed so that a number thereof may be nested in small compass to facilitate shipment and storage thereof.

A further object is to provide a sled such as described, wherein advantages afforded thereby are achieved by a novel construction comprising substantially flat front and rear sled sections of simple form joined to one another by means of a pair of joining members extending between and spacing said sections. With this arrangement the user may sit on the rear section, with the legs spanning the space between the sections, the feet resting on the front section and the hands gripping the joining members.

It is another object to provide a toboggan type sled such as described wherein the spacing of the front and rear sections appreciably reduces the amount of coasting or ground-engaging surface compared to a toboggan of equal width and length, without reducing the desired capacity of the sled and to the end that friction is reduced an extent providing for a smoother and faster gliding action.

An additional object of this invention is to provide a sled such as described wherein two joining members which bridge the space between the front and rear sections of the sled, serve as convenient handles and make it possible to steer the sled.

Another object of this invention is the provision of a sled such as described wherein the steering thereof may be effected by pulling up on one of the joining members and pushing down on the other, while pushing down with one foot or the other on one side or the other of the front section to tilt the front section to the right or the left depending upon the direction it is desired to steer the sled.

Yet another object of this invention is to provide a sled such as described wherein the joining members may be made of resilient and flexible bars that may be easily manipulated to cause the movements of the front section necessary to steer the sled.

Another object is to provide a sled such as described, wherein the front and rear sled sections may be inexpensively made of any suitable sheet material such as plywood, metal and the like, inasmuch as these sections for the most part are substantially flat, and wherein the joining or bridging members between these sections may also be inexpensively made of bar or rod stock.

Other objects and advantages of the invention will be hereinafter described, or will become apparent to those skilled in the art to which the invention appertains, and the novel features thereof will be defined in the appended claims.

In the accompanying drawing:

Fig. 1 is a perspective view of a sled embodying the present invention;

Fig. 2 is a side elevation of the sled; and

Fig. 3 is a top plan view thereof.

As shown in the accompanying drawing, a sled embodying the present invention comprises a front section, a rear section 2 and bridging or joining members 3. The members 3 are fastened to the sections 1 and 2 to maintain the latter in aligned and spaced relation with an open space or gap 4 therebetween.

The spacing of the front and rear sections 1 and 2 is such that the user of the sled may sit on the rear section 2 with the legs bent at the knees and spanning the space 4 between the sections while the feet of the user rest upon the front section 1. Thus seated, the user grips the joining members 3, and as will be hereinafter described, by manipulating the members 3 and pressing on the front section 1 with the feet, may steer the sled.

The sled sections 1 and 2 may be inexpensively made as they are substantially flat and rectangular, with the rear section 2 somewhat longer than the front section. Any suitable sheet material such as plywood or sheet metal may be used, or the sections may be fabricated in any suitable manner provided they are substantially flat and present smooth gliding surfaces on the undersides thereof and are of a size to serve the purposes aforementioned. As here shown, the front ends of the sections 1 and 2 are rounded and turned upwardly as at 5 and 6 respectively to facilitate the desired coasting action.

As here shown, two joining or bridging members 3 are employed, being fastened at their ends by means of suitable fastenings 7 to the rear portion of the front section 1 and the front portion of the rear section 2, respectively. Preferably the members 3 are mounted substantially in line with the side or longitudinal edges of the sections 1 and 2 so as to provide ample space to accommodate the legs of the user.

In order that the bridging or joining members 3 may be conveniently gripped, also readily manipulated in steering the sled, as well as serve as means for maintaining the sled sections 1 and 2 in the desired spaced relation, each bridging member is bowed upwardly or arched between its ends and formed as a bar or rod. Any suitable metal bar or rod stock may be used, provided it has the rigidity to serve the purposes herein noted. If desired, these bridging members may be made of spring steel or other resilient material so that they will be somewhat yieldable yet sufficiently rigid to hold the sled sections in the desired spaced relation, subject, however, to such relative movement as may be required to steer the sled.

In the steering of the sled, the user seated on the rear section 2, as hereinbefore noted, while gripping the arched bridging members 3, may push downwardly on one of the bridging members and pull upwardly on the other, at the same time pushing down with one foot or the other on one side or the other of the longitudinal medial line of the front section, thereby tilting the front section to the right or left depending upon which direction it is desired to steer the sled. If the front section is tilted to the right the sled is steered accordingly. Likewise, tilting of the front section to the left causes the sled to be steered to the left.

The use of resilient and somewhat flexible joining or bridging members 3 makes it possible more readily to steer the sled, as the front section may be moved a limited extent in the direction it is intended to steer the sled, due to the flexure of the members 3, when an upward force is exerted on one member and a downward force is exerted on the other member, aided by appropriate pressure of the user's feet on the front section.

The upwardly turned front end 5 of the front section may serve as a stop or rest for the feet of the user of the sled. If desired, a cleat 8 may be mounted on the front section 1 as a foot rest.

It is important to note that due to the spacing of the front and rear sections, there is considerably less friction-producing area on the sled compared to a toboggan of equal width and length. This spacing does not appreciably reduce the desired carrying capacity of the sled, and by reducing friction a smoother and faster coasting action is made possible.

I claim:

1. In a sled of the toboggan type comprising: substantially flat front and rear sled sections and means interconnecting said sections; said interconnecting means comprising solely a pair of elongated, flexible bars rigidly connected at their opposite ends to the front and rear sections of said sled at the respective opposite sides of said sled; each bar extending upwardly from said front sled section to a point spaced upwardly of the sections and having an elongated hand-grip section extending longitudinally of the sled; and each of said bars having a portion extending downwardly from said hand-grip section and connected to said rear sled section.

2. In a sled of the toboggan type comprising: substantially flat front and rear sled sections; a pair of elongated, flexible bars connected at their opposite ends to the front and rear sections of said sled at the respective opposite sides of said sled; each bar comprising front and rear ends extending upwardly from their connection to the sled sections and a hand-grip section disposed generally at an elevation above the sled so as to be manually gripped by the user of the sled sitting on the rear section with the feet resting on the front section and the hands gripping said hand-grip portions.

References Cited in the file of this patent

UNITED STATES PATENTS

| | | |
|---|---|---|
| 350,123 | Ferguson | Oct. 5, 1886 |
| 359,736 | Migeon | Mar. 22, 1887 |
| 2,616,715 | Billings | Nov. 4, 1952 |

FOREIGN PATENTS

| | | |
|---|---|---|
| 82,875 | Switzerland | Apr. 1, 1920 |